United States Patent [19]

Jackson

[11] 4,376,793

[45] Mar. 15, 1983

[54] PROCESS FOR FORMING A HARDFACING SURFACE INCLUDING PARTICULATE REFRACTORY METAL

[75] Inventor: Hewy E. Jackson, Livingston, Tex.

[73] Assignee: Metallurgical Industries, Inc., Tinton Falls, N.J.

[21] Appl. No.: 297,339

[22] Filed: Aug. 28, 1981

[51] Int. Cl.³ .............................................. B05D 1/08
[52] U.S. Cl. ..................................... 427/34; 427/423; 219/121 PL
[58] Field of Search ................................ 427/34, 423; 219/121 PL

[56] References Cited

U.S. PATENT DOCUMENTS 3,419,415 12/1968 Dittrich ................................ 427/423
3,496,682 2/1970 Quaas et al. ......................... 427/423
4,003,115 1/1977 Fisher .................................. 427/423
4,013,453 3/1977 Patel ................................... 427/423

*Primary Examiner*—John H. Newsome
*Attorney, Agent, or Firm*—Carella, Byrne, Bain & Gilfillan

[57] ABSTRACT

There is disclosed a process for forming a hardfacing surface including particulate refractory metal carbide by directing a plasma transferred arc against a wear surface of an element and passing a powder comprised of refractory metal carbide particles admixed in a suitable hard metal matrix through the plasma arc to thereby form on the wear surface of the element a hardfacing surface including particulate refractory metal carbide of a thickness of from 0.04 to 0.25 inches.

17 Claims, No Drawings

4,376,793

PROCESS FOR FORMING A HARDFACING SURFACE INCLUDING PARTICULATE REFRACTORY METAL

FIELD OF THE INVENTION

This invention relates to the hardfacing of a metallic substrate, and more particularly to the formation of a hardfacing surface including particulate refractory metal carbide on elements of assemblies, such as earth contacting devices.

BACKGROUND OF THE INVENTION

Earth contacting devices, such as drill bits, drill collars, stabilizers, and the like, and agricultural implements, such as threshers, reapers and the like include wear or contact surfaces exposed to erosive wear due to contact with geological materials including rock formations and crops to be harvested, respectively, and require frequent replacement and/or techniques to refurbish the contacting surface thereof. Stabilizers utilized for improving down-hole conditions during well drilling are positioned in the drill-string proximate the drill bit. Replacement of a stabilizer necessitates the withdrawal and repositioning of the drill-string, generally a daily routine, a time-consuming and costly protocol with concomitant loss in bore hole depth production.

Stabilizers have been manufactured with costly cemented tungsten carbide compacts with such types of stabilizers suffering from the problem of bit loss due to matrix erosion. Additionally, such tungsten carbide compact containing stabilizers do not provide for a continuous contact surface thereby reducing stabilizer efficaciousness.

OBJECTS OF THE INVENTION

An object of the present invention is to provide a novel process for forming, utilizing a plasma transferred arc, a hardfacing surface including particulate refractory metal carbide on a wear surface of an element of assemblies, such as earth contacting devices.

A further object of the present invention is to provide a novel process for forming, utilizing a plasma transferred arc, a hardfacing surface including particulate refractory metal carbide on a wear surface of elements of a stabilizer disposed in a drill-string.

Still another object of the present invention is to provide a novel process for forming, utilizing a plasma transferred arc, a hardfacing surface including particulate refractory metal carbide on a wear surface of elements of a stabilizer disposed in a drill-string.

Still another object of the present invention is to provide a novel process for forming, utilizing a plasma transferred arc, a hardfacing surface including particulate refractory metal carbide on a wear surface of elements permitting improved production rates of assemblies employing such devices.

Yet another object of the present invention is to provide a novel process for forming, utilizing a plasma transferred arc, a hardfacing surface including particulate refractory metal carbide on a wear surface of elements permitting improved rates of production of such elements.

A further object of the present invention is to provide a novel process for forming, utilizing a plasma transferred arc, a hardfacing surface including particulate refractory metal carbide on a wear surface of elements of a stabilizer of improved useful life.

A further object of the present invention is to provide a novel process for forming, utilizing a plasma transferred arc, a hardfacing surface including particulate refractory metal carbide on a wear surface of elements of a stabilizer of improved performance.

SUMMARY OF THE INVENTION

These and other objects of the present invention are obtained by directing a plasma transferred arc against the surface of an element of assemblies, such as an earth contacting device, and passing a powder comprised of one or more refractory metal carbides and preferably tungsten carbide with or without tantalum carbide and titanium carbide particles having a desired size distribution admixed in an iron and nickel based hard metal matrix comprising from 90 to 100% by weight of an iron based hard metal alloy consisting by weight from approximately 22 to 37% chromium, 0 to 20% nickel, 0 to 2.3% carbon with the balance iron through the plasma arc thereby to form a hardfacing surface including a refractory metal carbide having a thickness preferably of from 0.04 to 0.25 inches on the element.

DETAILED DESCRIPTION OF THE INVENTION

The refractory metal carbide containing hardfacing powder to be utilized in the present invention is comprised of a refractory metal carbide having a particle size distribution preferably of from −10 to +80 mesh U.S. standard. The hard metal matrix is an iron based alloy as aforesaid preferably having a particle size distribution of from −60 to +325 mesh U.S. standard. The refractory metal carbide particles are admixed in the hard metal matrix in an amount of from approximately 50 to 65% refractory metal carbide and preferably about 57% refractory metal carbide.

A torch of a plasma transferred arc system creates a constrictive high-energy, high-temperature (30,000° F.) arc of an ionized inert gas, such as argon, and is cooled by recirculating an intermediate heat transfer fluid, such as water passing through internal chambers formed in the torch. The torch is provided with a plurality of orifices for the controlled introduction of the hardfacing powder, preferably the hard metal matrix through one set of orifices and the refractory metal carbide through another orifice, into the plasma arc. The plasma arc melts the hard metal components thereof prior to the deposition on the surface of the substrate being treated with the refractory metal carbide being deposited into the molten pool.

The metallic substrate is generally formed of a material, such as heat treated steel or the like, consistent with the intended duty thereof. The metallic element or substrate is disposed generally a distance of 0.30 to 0.75 inches from the end of the torch. A relative movement between the torch and the element at a linear rate of from 1 to 17 inches per minute is common dependent upon the width and depth of the intended hardfacing deposition.

In the present invention, the hardfacing powder including both the hard metal matrix and the refractory metal carbide is passed through the plasma arc at a rate of about 1 to 15 pounds per hour to form a hardfacing surface on the substrate of a thickness of from 0.040 to 0.250 inches. Accordingly, a hardfacing surface is readily formed on the substrate, such as the contact surface of a stabilizer, of improved efficaciousness as well as reduced cost, as compared, for example, with a stabilizer formed from a refractory metal carbide such as tungsten carbide, bits embedded in the matrix.

Additionally, the present invention permits improved rates of production of hardfacing surfaces as well as improved protection rates of any assembly employing an element or elements having a hardfacing surface formed by the process of the present invention.

EXAMPLES OF THE PRESENT INVENTION

The following examples are included for the purposes of illustrating the invention, and it is to be understood that the scope thereof is not to be limited thereby.

EXAMPLE I

An iron based alloy by weight consisting of approximately 0 to 0.06% carbon, 33 to 37% chromium, 0 to 0.2% manganese, 2 to 4% silicon and the balance iron except for trace elements which are irrelevant to the present invention is mixed with preferably pure nickel at a weight ratio of 90% of the iron based alloy to 10% nickel to 100% of the iron based alloy and no nickel. A typical assay of a usable nickel based alloy is by weight 0 to 0.06% carbon, 0 to 0.5% iron, 0.5 to 1.8% silicon, 0.5 to 0.8% boron, 1.5 to 3.5% titanium and 0.1 to 0.2% aluminum with the balance nickel. It is also common for the iron based alloy aforesaid to include up to 1% maximum nickel.

The hard metal matrix is passed through the plasma transferred arc at a rate of 55 to 75 grams per minute. Tungsten carbide is also fed into the plasma transferred arc and onto the pool of molten hard metal matrix at a rate compatible with the rate of feed of the hard metal matrix so that the tungsten carbide represents from approximately 50 to 65% by weight of the combined hard metal matrix and tungsten carbide with a rate of approximately 60% being preferred.

The particle size distribution of the tungsten carbide is −10 to +60 mesh U.S. standard.

The iron based portion of the hard metal matrix should preferably be formed by gas atomization techniques rather than water atomization by virtue of the fact that water atomization techniques generate a particle shape which is sufficiently irregular to generate a fluffy powder which feeds through the orifices of the plasma transferred arc nozzles sufficiently slowly to result in extremely low rates of deposition and matrix degradation.

The hardfacing powder generates a hardfacing surface of a thickness of 0.125 inches −0.10 inches.

In the preferred embodiment of the above example, the weight percent of carbon in the hard metal matrix does not exceed approximately 0.8%. A preferred nominal carbon of 0.02% or less is preferred.

In the event that the aforesaid maximum carbon content is exceeded, the hardfacing is too hard and tends to be brittle. The nickel adds to toughness but should be limited to approximately 10% by weight otherwise the hardfacing becomes too soft.

The ratio of the hard metal matrix to tungsten carbide is quite critical to invention. If the ratio of tungsten carbide to the hard metal matrix exceeds approximately 60% tungsten carbide to 40% of the matrix, there is an increased risk of unacceptable cracks; if the ratio is reduced to less than 50% tungsten carbide, the hardfacing exhibits low wear resistance. The preferred embodiment of the invention in this example employs a tungsten carbide to hard metal matrix ratio of approximately 60 to 40% by weight.

EXAMPLE II

An iron based hard metal matrix is prepared by mixing from approximately 90% by weight of an iron based alloy with 10% by weight of nickel to approximately 80% by weight of the iron based alloy to 20% by weight of nickel. The iron based alloy contains by weight from approximately 2.6% to 2.9% carbon, 28 to 30% chromium, 0 to 0.1% manganese and 0.6 to 1.0% silicon with trace elements irrelevant to the present invention. The nickel is either 100% pure nickel or the nickel alloy set forth in Example I.

The feed rates as between the hard metal matrix and the tungsten carbide are the same as set forth in Example I. As in Example I, it is critical to the rate of deposition and the quality of the hardfacing to employ water atomized iron based hard metal constituents. The particle size distribution of the tungsten carbide is the same as set forth in Example I.

The tungsten carbide of Examples I and II preferably contains approximately 6.0% carbon, 6.0% cobalt and the balance tungsten carbide. However, the cobalt can range from 4.5% to 25% by weight. Additionally, steel cutting grade tungsten carbide may be employed which employs up to approximately 10% each by weight of titanium carbide and tantalum carbide in addition to the tungsten carbide.

While the present invention has been described primarily in the context of forming a hardfacing surface on the wear or contact surface of replacement blades or pads of a stabilizer utilized in the drilling of wells, i.e., down-hole equipment, the process of the present invention is applicable to treating the contact surfaces of drill bits; plows; cutting parts in combines, threshers and the like; digger teeth of trenching equipment; pulverizing hammers; grinding teeth in road surfacing equipment; etc.

While the invention has been described in connection with a preferred embodiment thereof, it will be understood that many modifications will be apparent to those of ordinary skill in the art; and that this application is intended to cover any adaptation or variation thereof.

What is claimed:

1. A process for forming a hardsurfacing including refractory metals carbide particles on a wear surface of an element which comprises:
   (a) positioning a plasma arc proximal to a wear surface of an element;
   (b) passing a hardfacing powder through said plasma arc to form a hardfacing surface on said element; the hardfacing powder comprising refractory metal carbide particles and a hard metal matrix, the refractory metal carbide appearing in amounts of approximately 50 to 65% by weight of the hard metal and refractory metal carbide; the hard metal consisting by weight of approximately 0% to 2.3% carbon; 22% to 37% chromium; 0% to 20% nickel with the balance iron.

2. The process as defined in claim 1 wherein the refractory metal carbide is by weight approximately from 0% to 10% each of titanium carbide and tantalum carbide with the balance tungsten carbide.

3. The process as defined in claim 1 wherein the hard metal matrix includes not more than approximately 0.06% by weight carbon.

4. The process as defined in claim 2 wherein the hard metal matrix includes not more than approximately 0.02% by weight carbon.

5. The process as defined in claim 1 wherein the hard metal matrix consists of by weight approximately 0% to 0.8% carbon; 29% to 37% chromium; 0% to 10% nickel with the balance iron.

6. The process as defined in claim 1 wherein the hard metal matrix consists of by weight approximately 0% to 0.60% carbon; 31% to 35% chromium; 0% to 6% nickel and the balance iron.

7. The process as defined in claim 1 wherein the hard metal matrix consists of by weight approximately 2.0% to 2.65% carbon; 22.0% to 27.0% chromium; 9.0% to 19.5% nickel and the balance iron.

8. The process as defined in claim 1 wherein the hard metal matrix consists of by weight approximately 2.0% to 2.35% carbon; 22.0% to 24.0% chromium; 18.5% to 19.5% nickel and the balance iron.

9. The process as defined in any one of claims 3, 4, 5, 6, 7 or 8 wherein the refractory metal carbide is tungsten carbide.

10. The process as defined in any one of claims 3, 4, 5, 6, 7 or 8 in which the refractory metal carbide is sintered tungsten carbide.

11. The process as defined in any one of claims 3, 4, 5, 6, 7 or 8 wherein the refractory metal carbide is metal cutting grade tungsten carbide.

12. The process as defined in any one of claims 3, 4, 5, 6, 7 or 8 wherein the refractory metal carbide consists of by weight approximately 8% to 25% cobalt with the balance tungsten carbide.

13. The process as defined in any one of claims 3, 4, 5, 6, 7 or 8 wherein said plasma arc is positioned at from 0.30 to 0.75 inches from a source of said plasma arc.

14. The process as defined in any one of claims 3, 4, 5, 6, 7 or 8 wherein said element is processed at a rate of from 1 to 12 inches per minute during step (b).

15. The process as defined in any one of claims 3, 4, 5, 6, 7 or 8 wherein said hardfacing powder is passed through said plasma arc at a rate of from 1 to 15 pounds per hour.

16. The process as defined in any one of claims 1, 2, 3, 4, 5, 6, 7 or 8 wherein said element is a stabilizer for use in a drill-string.

17. The process as defined in any one of claims 1, 2, 3, 4, 5, 6, 7 or 8 wherein said element includes replacement blades for a drill-string stabilizer and said hardfacing surface is formed on said replacement blades.

* * * * *